United States Patent [19]
Akiyama et al.

[11] Patent Number: 5,805,699
[45] Date of Patent: Sep. 8, 1998

[54] SOFTWARE COPYING SYSTEM

[75] Inventors: Ryota Akiyama; Makoto Yoshioka; Yoshiaki Uchida, all of Kawasaki, Japan

[73] Assignee: Fujitsu Limited, Kawasaki, Japan

[21] Appl. No.: 742,601

[22] Filed: Oct. 28, 1996

[30] Foreign Application Priority Data

May 20, 1996 [JP] Japan .................................. 8-124823

[51] Int. Cl.$^6$ ....................................................... H04L 9/00
[52] U.S. Cl. ................................................. 380/4; 380/25
[58] Field of Search ................................ 380/3, 4, 25, 49

[56] References Cited

U.S. PATENT DOCUMENTS

| | | | |
|---|---|---|---|
| 4,658,093 | 4/1987 | Hellman ........................................ | 380/4 |
| 5,182,770 | 1/1993 | Medveczky et al. ........................ | 380/4 |
| 5,421,006 | 5/1995 | Jablon et al. ................................ | 380/4 |
| 5,513,260 | 4/1996 | Ryan ............................................. | 380/3 |
| 5,659,613 | 8/1997 | Copeland et al. ........................... | 380/4 |

*Primary Examiner*—Salvatore Cangialosi
*Attorney, Agent, or Firm*—Staas & Halsey

[57] ABSTRACT

A software copying system which enables copyrighted software recorded in a master storage medium to be copied to a user's target storage medium in a legitimate manner. A contents identifier reading unit reads out a software identifier from the master storage medium, while a storage medium identifier reading unit reads out a storage medium identifier from the target storage medium., The two identifiers are then sent to a central site which manages licenses for the right to copy software products. At the central site, a signature generating unit produces a first signature from those identifiers and sends it back to the user's site, where a signature writing unit writes the received signature into the target storage medium. A signature generating/comparing unit produces a second signature out of the same identifiers as those sent to the central site, and compares it with the first signature stored in the target storage medium. A data copying unit copies the subject software data file from the master storage medium to the target storage medium, only when the first and second signatures coincide with each other.

7 Claims, 10 Drawing Sheets

SOFTWARE COPYING SYSTEM

BACKGROUND OF THE INVENTION

1. Field of the Invention

The present invention relates to software copying systems, and more specifically, to a software copying system which enables copyrighted software to be duplicated in a user's storage medium in a legitimate manner.

2. Description of the Related Art

A wide variety of software distribution methods have become available in recent years, and the consumers can purchase software products which are stored in some storage media such as floppy disks, compact disc read-only memories (CD-ROMs), and semiconductor memories. They can also buy some software products sold at on-line shops by downloading via networks. Most of such commercial software products, however, can be copied into other storage media easily. This means that they are exposed to the potential risk of illegal duplication, or software piracy, which has become a serious problem for copyrighted software.

As to the software distribution methods for computer applications, dictionaries, audio and video data, etc., one of the conventional methods is to distribute them in a CD-ROM that is electronically locked by a protection key. When a user is interested in a certain software product, he/she makes contact with a central site that is dealing that product. The user then takes a necessary procedure to purchase it, and in turn receives a key pertaining to the product. By opening the protected software archive with that key, the user can finally install it into his/her system.

Another method of software distribution uses a writable storage medium that contains some license-specific identification information burned in advance, which information is managed at the central site for licensing the right to copy their software products. When trying to duplicate a software product recorded in a CD-ROM, a user or a retailer selling the storage media will send their request to the central site. After following some necessary procedures for purchasing that subject software product, the requesting user or retailer receives identification information issued by the central site. The subject software product can be duplicated from the CD-ROM to the storage medium, only when the received identification information coincides with the license-specific identification information recorded in the storage medium.

But anyone can execute or make access to the software, once it is installed into his/her local storage device such as a hard drive. This simply means that the installed software still is a subject of illegal duplication due to the lack of key protection.

Further, in the aforementioned second method, the license-related identification information should be controlled at the central site in close liaison with a factory where the storage media are manufactured. Another problem with the storage media is that it is required to handle two types of storage media in different ways for two distinct purposes: software copying and general use.

SUMMARY OF THE INVENTION

Taking the above into consideration, an object of the present invention is to provide a software copying system which enables copyrighted data recorded in a master storage medium to be copied in a legitimate manner to a target storage medium that a user can read and write to.

To accomplish the above object, according to the present invention, there is provided a software copying system for duplicating software recorded in a master storage medium to a target storage medium in a legitimate manner. An authorized copying process is achieved through communications between an end user's site that is requesting a license of copying the software product and a central site that manages the license.

The software copying system comprises the following structural elements. Contents identifier reading means reads out a first identifier the master storage medium. This first identifier is uniquely assigned to the software product recorded in the master storage medium. Storage medium identifier reading means reads out a second identifier from the target storage medium. This second identifier is uniquely assigned to and recorded in the target storage medium. Signature generating means, which is disposed at the central site, generates a first signature from the first identifier read out by the contents identifier reading means and the second identifier read by the storage medium identifier reading means. This first signature serves as a certificate of a license to copy the software product. Signature writing means writes the first signature generated by the signature generating means into the target storage medium. For a verification purpose, signature generating/comparing means generates a second signature from the first identifier read out by the contents identifier reading means and the second identifier read out by the storage medium identifier reading means. The signature generating/comparing means then compares the first signature stored in the target storage medium with the second signature. Data copying means retrieves the software product out of the master storage medium and writes the software product into the target storage medium, when the first and second identifiers turned out to be identical as a result of the comparison performed by the signature generating/comparing means.

To accomplish the above object, there is also provided a software copying method for duplicating software recorded in a master storage medium to a target storage medium in a legitimate manner. This software copying method comprises the following steps.

First, a storage medium identifier uniquely assigned to the target storage medium and a contents identifier uniquely assigned to a subject data file are sent from an end user's site to a central site, together with a message requesting a software license. Second, a first certificate code is generated at the central site from the storage medium identifier and the contents identifier received from the end user site. This step is accomplished through a signature generating process using a certification key that is managed at the central site. Third, an encrypted certification key is generated at the central site by encrypting the certification key using a user key. Fourth, the first certificate code and the encrypted certification key are sent from the central site to the end user's site. Fifth, the first certificate code and the encrypted certification key arrived at the end user's site from the central site is written into the target storage medium. Sixth, a decrypted certification key is obtained at the end user's site by decrypting, using the user key, the encrypted certification key stored in the target storage medium. Seventh, a second certification code is generated, for the purpose of verification at the end user's site, by applying a signature generating process using the decrypted certification key to the storage medium identifier and the contents identifier. Eighth, the first certificate code stored in the target storage medium is compared with the second certificate code that is generated at the end user's site. Lastly, the subject data file stored in the master storage medium is read out and written into the target storage medium if the first and second certificate codes coincide with each other.

The above and other objects, features and advantages of the present invention will become apparent from the following description when taken in conjunction with the accompanying drawings which illustrate a preferred embodiment of the present invention by way of example.

DESCRIPTION OF THE PREFERRED EMBODIMENT

Figure 1:
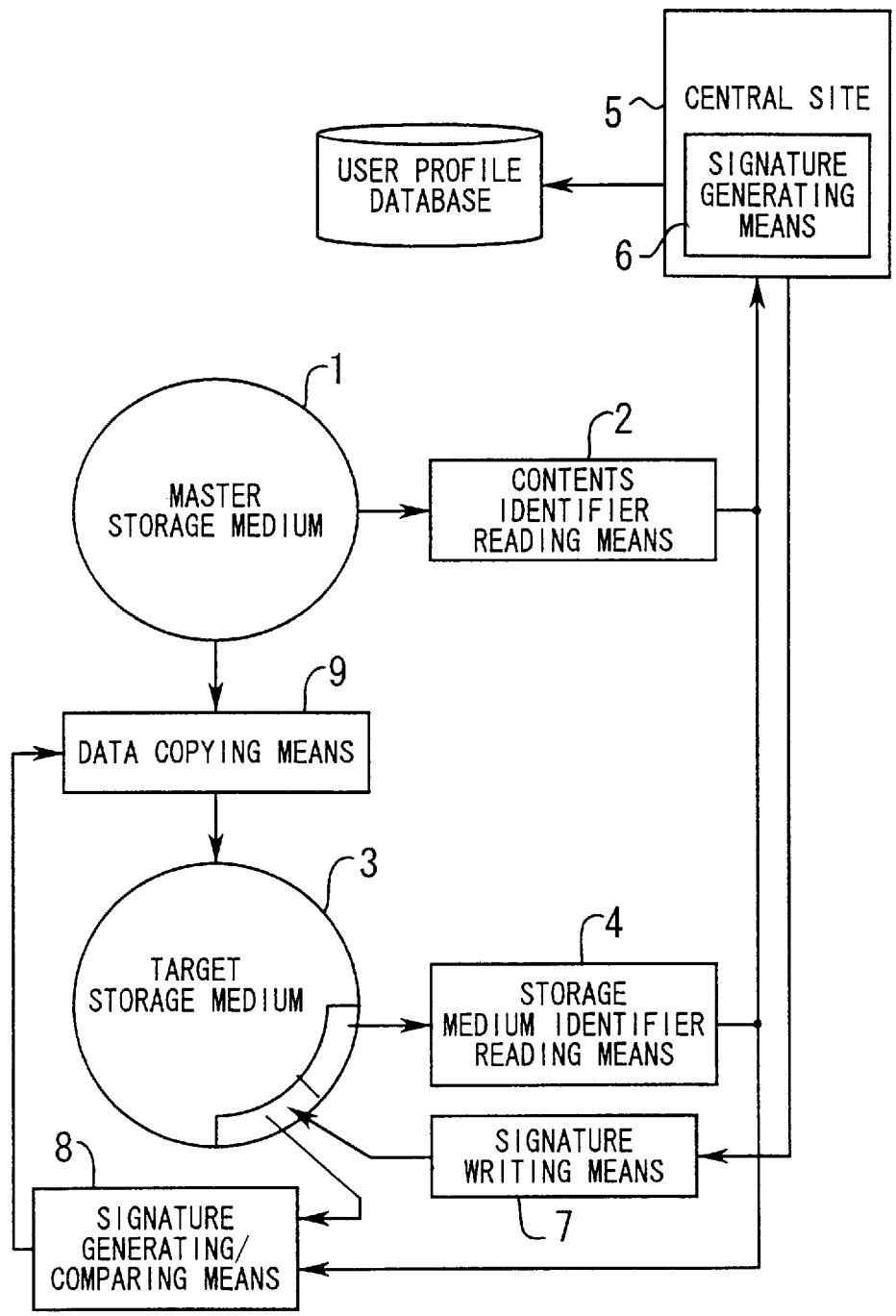
FIG. 1 is a conceptual view of a software copying system according to the present invention.

At the outset, the present invention will be outlined with reference to FIG. 1, which shows a conceptual view of a software copying system according to the present invention.

As seen in FIG. 1, the software copying system of the present invention comprises several elements described below. Contents identifier reading means 2 is a means for reading out a first identifier stored in a master storage medium 1. This first identifier is uniquely assigned to each software product recorded in the master storage medium 1. Storage medium identifier reading means 4 reads out a second identifier stored in a target storage medium 3. This second identifier is uniquely assigned to the target storage medium 3. Signature generating means 6, disposed at a central site 5 that manages licenses for software copying, generates a first signature from the first and second identifiers read out by the contents identifier reading means 2 and storage medium identifier reading means 4, respectively. The first signature serves as a certificate of a license to copy the software product. Signature writing means 7 writes the first signature, which is generated by the signature generating means 6, into the target storage medium 3. Signature generating/comparing means 8 produces a second signature from the first and second identifiers respectively read out by the contents identifier reading means 2 and storage medium identifier reading means 4. The signature generating/comparing means 8 compares the first signature stored in the target storage medium 3 with the second signature that is produced. Data copying means 9 retrieves the subject software product out of the master storage medium 1 and writes it into the target storage medium 3, when the first and second signatures turned out to be identical as a result of the comparison performed by the signature generating/comparing means 8.

The master storage medium 1 contains several commercial software products, to each of which a contents identifier is written. The target storage medium 3 has an individual storage medium identifier which is written at the factory before shipment. When a user selects a software product from among those in the master storage medium 1, the contents identifier reading means 2 retrieves a contents identifier corresponding to the selected software product, and then the storage medium identifier reading means 4 reads out a storage medium identifier recorded in the target storage medium 3. Those two identifiers are transmitted to the central site 5 together with a purchase order message to request a license to copy the subject software product. At the central site 5, the signature generating means 6 receives the contents identifier and storage medium identifier and sends back to the user a signature that is generated from the received identifiers. This signature authorizes the user as a licensee having the right to copy the software product. Simultaneously with the issue of the signature, the user is registered in a user profile database at the central site 5, and a billing process is also invoked.

At the user side, upon receipt of the signature sent from the signature generating means 6, the signature writing means 7 writes it into the target storage medium 3. The signature generating/comparing means 8 then locally generates a signature from the contents identifier retrieved by the contents identifier reading means 2 and the storage medium identifier retrieved by the storage medium identifier reading means 4. The signature generating/comparing means 8 compares this signature with the first-mentioned signature stored in the target storage medium 3. If the two signatures coincide with each other, the data copying means 9 retrieves the subject software product, which is stored in encrypted form, from the master storage medium 1 and copies it into the target storage medium 3. The software now stored in the target storage medium 3, however, is not ready for execution because it is still encrypted. The user has to load it to the main memory of a special processor which decodes and executes the encrypted software.

Next, a first embodiment of the present invention will be described below with reference to FIGS. 2 to 6. The following explanation assumes such a case that a certain copyrighted software program distributed in a CD-ROM is to be copied into a magneto-optical (MO) disc.

Figure 2:
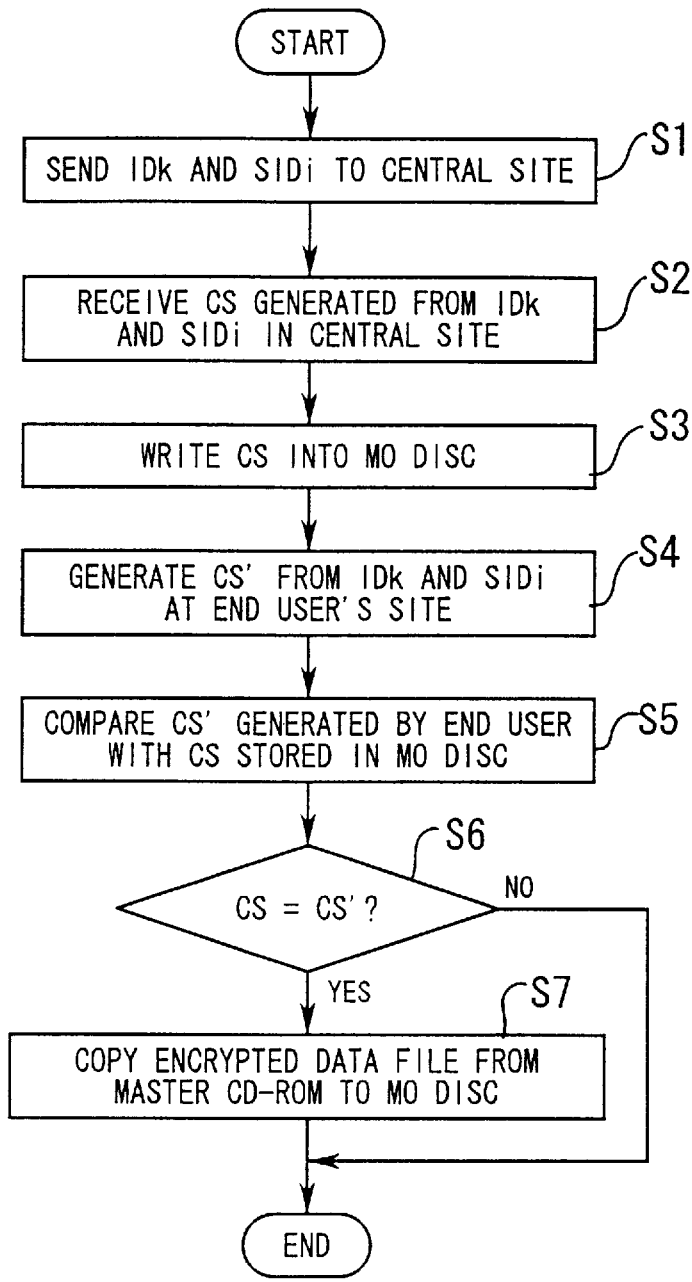
FIG. 2 is a flowchart showing a software duplication process executed by a software copying system in a first embodiment of the present invention.
Figure 3:
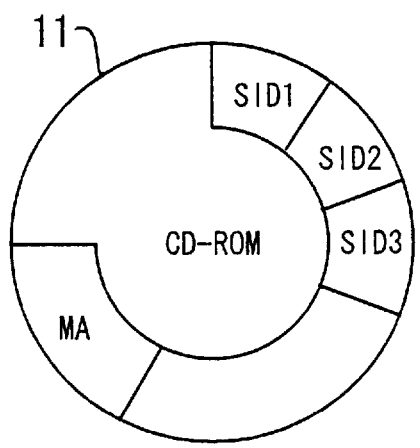
FIG. 3(A) is a diagram showing the structure of a CD-ROM.
FIG. 3(B) is a diagram showing the structure of an MO disc.
Figure 3:
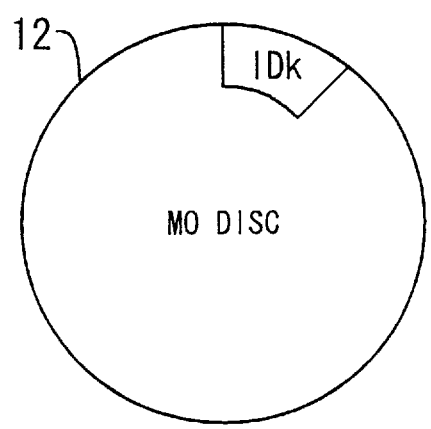

FIG. 2 is a flowchart showing a software duplication process performed by the software copying system. To copy a program in a CD-ROM to an MO disc using the software copying system of the present invention, it is necessary to follow the steps of:

[S1] The storage medium identifier IDk recorded in the MO disc and the software identifier SIDi of the subject software program are sent to the central site which manages license for software copying.

[S2] This request for the software license is processed at the central site, where a certificate code CS is generated from the storage medium identifier IDk and software identifier SIDi received from the end user site. The central site then sends back the certificate code CS to the end user site.

[S3] The certificate code CS arrived at the end user's site is written into a predetermined storage region in the MO disc.

[S4] For a verification purpose, another certificate code CS' is generated locally at the end user's site, based on the storage medium identifier IDk and software identifier SIDi, which were sent to the central site.

[S5] The locally generated certificate code CS' is compared with the other certificate code CS stored in the MO disc.

[S6] According to the result of the comparison between CS and CS', the process proceeds in different ways. If the two certificate codes are found identical, the process goes to the next step S7. Otherwise, the process is terminated without copying the software program from the CD-ROM to the MO disc.

[S7] An encrypted software data file having the software identifier SIDi is copied from the CD-ROM to the prepared MO disc.

FIGS. 3(A) and 3(B) show the structure of records in a CD-ROM and an MO disc, respectively. The structure of a CD-ROM 11 is shown in FIG. 3(A), where a plurality of copyrighted software programs and a manager application program MA are recorded. The copyrighted software programs, stored in encrypted form, have their respective software identifiers SIDi (i=1,2, . . . ,n). The manager application program MA governs the operations to copy the copyrighted software programs from a CD-ROM to an MO disc. Upon request for software copying, this program will be loaded into and executed on a terminal station (e.g., a personal computer) located at the end user's site. That is, the manager application program MA is responsible for the steps executed at the end user's site as part of the procedure shown in FIG. 2.

FIG. 3(B) is a diagram showing the record structure of the MO disc 12, where a storage medium identifier IDk (k=1,2, . . . ,m) is recorded. Although most part of the MO disc 12 can be freely written and/or read by the end users, the storage medium identifier IDk is written in a special part of the disc that is not rewritable. This storage medium identifier IDk may be a serial number which is assigned uniquely to each medium at the factory before shipment.

Figure 4:
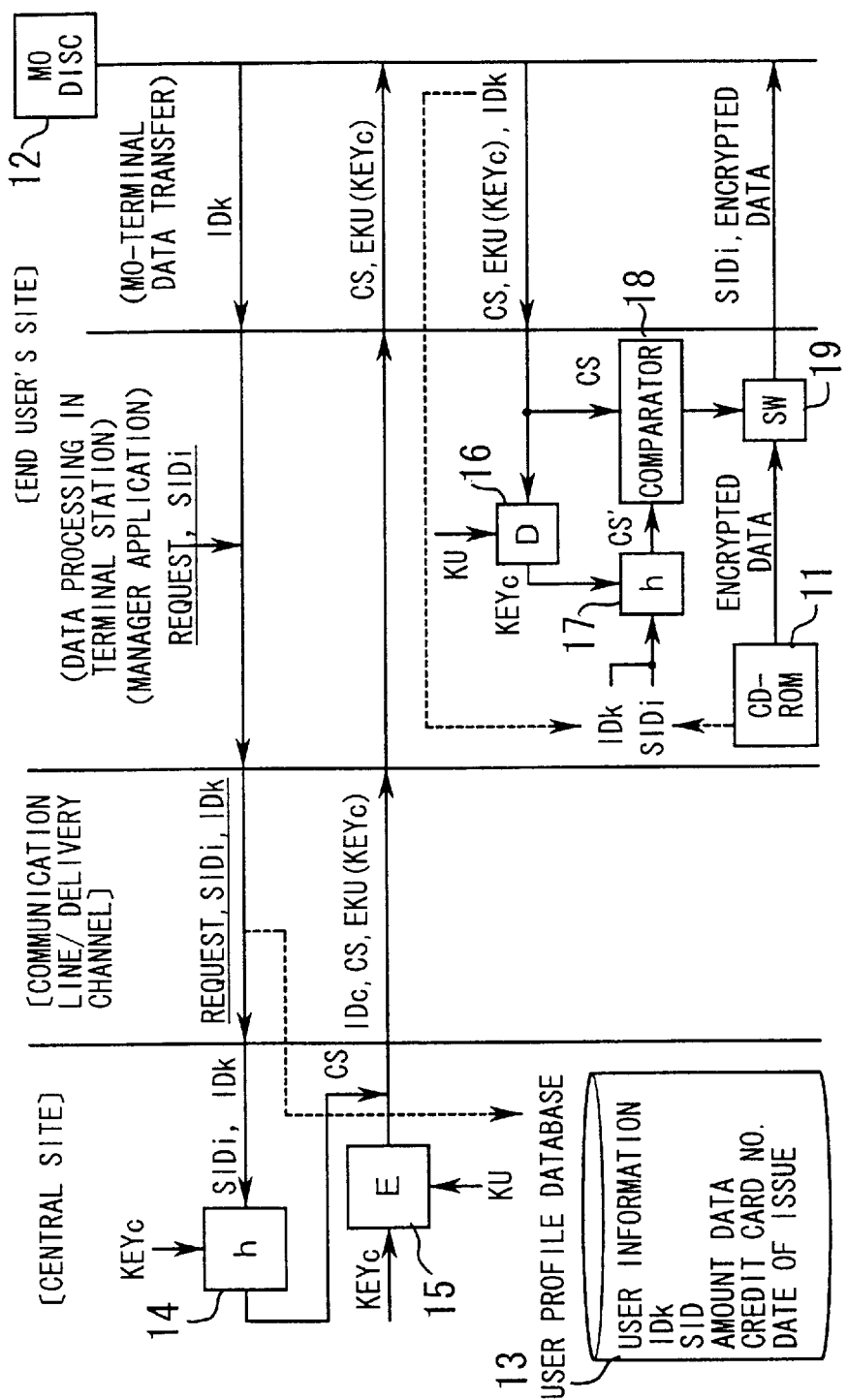
FIG. 4 is a diagram showing a procedure of duplicating copyrighted software.

The following description will present a more detailed procedure of duplicating copyrighted software from a CD-ROM to an MO disc with reference to FIG. 4.

FIG. 4 shows a software copying procedure, which is roughly divided into two parts: steps at the end user's site (the right half of FIG. 4) and steps at the central site (the left half of FIG. 4). At the end user's site, a terminal station (e.g., a personal computer) performs actual data processing jobs pertaining to the software copying, while several devices located at the central site manages license for the software copying. Those two sites are interconnected by a communication line or a delivery channel.

The terminal station at the end user's site is equipped with a CD-ROM drive and an MO drive (both not shown). The CD-ROM 11, serving as a master storage medium that stores copyrighted software programs, is inserted in the CD-ROM drive. On the other hand, the MO disc 12 serving as a target storage medium is loaded in the MO drive. The subject software program in the CD-ROM 11 has a software identifier SIDi, and the MO disc 12 owns its unique storage medium identifier IDk.

First of all, at the end user's terminal station, the manager application program MA in the CD-ROM 11 starts with accepting a request from the end user for copying a specific software program. Upon this request, the manager application program MA reads out the corresponding software identifier SIDi from the CD-ROM 11 as well as extracting the storage medium identifier IDk from the MO disc 12. Those two identifiers are then sent to the software license center along with a request message containing information necessary for a software license.

The central site receives the above-described request from the user and saves the contents of the request into a user profile database 13. The received software identifier SIDi and storage medium identifier IDk are supplied to a signature processor 14, where the identifiers SIDi and IDk are compressed into a certificate code CS. In this compression process, a certification key REYc operates as a private key (or secret key). The produced certificate code CS will serve as what is referred to as the "signature" in FIG. 1. The certification key REYc used by the signature processor 14 is then directed to an encryption unit 15 to be encrypted with a user key KU, thus producing a ciphertext EKU(REYc). The certificate code CS generated by the signature processor 14 and the ciphertext EKU(FYc) generated by the encryption unit 15 are finally transmitted together with the central site identifier IDc to the end user's site as a response to the request from the end user.

At the end user's site, the terminal station extracts the certificate code CS and ciphertext E(UREYc) from among the information received from the central site and writes them into the target MO disc 12. The certificate code CS and ciphertext =U(EYc) recorded in the MO disc 12 are retrieved and sent to the manager application program.

Then, in the terminal station, a signature verification process starts. First, a decryption unit 16 decodes the ciphertext EKU(KEYc) using the user key KU and extracts the certification key REYc, which was once encrypted at the central site. Out of the software identifier SIDi retrieved from the CD-ROM 11 and the storage medium identifier IDk retrieved from the MO disc 12, a signature processor 17 generates a certificate code CS' for verification at the end user's site. The certification key REYc decrypted by the decryption unit 16 is used in this CS' generation process. Then, a comparator 18 compares the certificate code CS written in the MO disc 12 and the certificate code CS' generated by the signature processor 17. If the comparison result indicates coincidence of the two codes CS and CS', a switch 19 will enable the software program having the software identifier SIDi to be written into the target MO disc 12 in the form of encrypted data.

The following description will present a typical function achieved by the signature processor 14 at the central site and the signature processor 17 at the end user's site.

Figure 5:
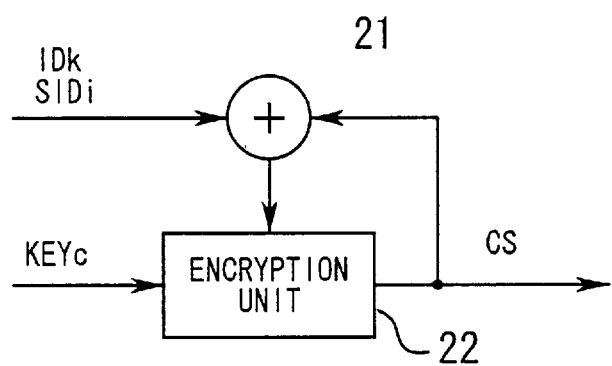
FIG. 5 is a diagram showing the structure of a typical signature processor.

FIG. 5 illustrates the structure of the signature processor, which consists of an exclusive OR logic 21 and an encryption unit 22. The exclusive OR logic 21 performs an exclusive OR operation on a software identifier SIDi, storage medium identifier IDk and certificate code CS. The encryption unit 22 encrypts the output of the exclusive OR logic 21 with the certification key REYc to produce the certificate code CS. Those two elements 21 and 22 thus constitutes a hash function operator.

In a block-by-block manner, the encryption unit 22 encrypts the software identifier SIDi and storage medium identifier IDk with the certification key REYc. The encrypted output data is fed back to the input of the exclusive OR logic 21 and directed to the exclusive OR operation with the next block data. The output of the exclusive OR logic 21 is then encrypted by the encryption unit 22 again. The above operations are repeated until the final block is entered, and the result of this cyclic computation will come out of the encryption unit 22 as a certificate code CS when the encryption of the final block is finished.

The licensed software program is copied to the MO disc 12 in the way described above, but the end user cannot run it as is, because the program is still encrypted. The following description will explain how it will be executed.

Figure 6:
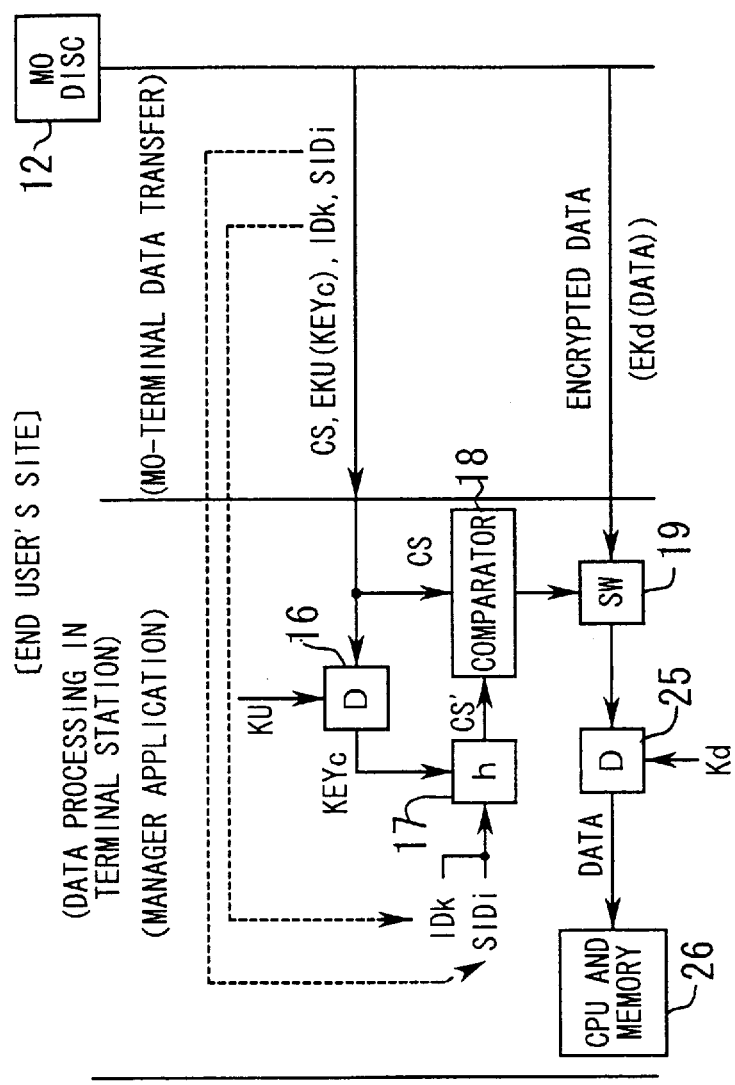
FIG. 6 is a diagram showing a procedure of executing a duplicated software program.

FIG. 6 shows a procedure of executing a duplicated software program. The MO disc 12 contains the certificate code CS, ciphertext EU(REYc), storage medium identifier IDk, and software identifier SIDi, as well as storing the duplicated software in the form of encrypted data EKd (DATA). This encrypted data EKd(DATA) was encrypted with a key Kd before the software was stamped to the CD-ROM, and the encryption key Kd is under the management of the manager application program.

The terminal station at the end user's site first retrieves from the MO disc 12 the certificate code CS, ciphertext EU(KEYc), storage medium identifier IDk, and software identifier SIDi. The decryption unit 16 decrypts the ciphertext EKU(REYc) with the user key Ku, thereby extracting the certification key REYc. Then the signature processor 17 generates another certificate code CS' from the software identifier SIDi and storage medium identifier IDk retrieved from the MO disc 12, using the certification key KEYc decrypted by the decryption unit 16. Subsequently, the comparator 18 compares the certificate codes CS and CS'. If the comparison indicates coincidence of the two codes CS and CS', the switch 19 will allow an encrypted data file EKd(DATA) containing the encrypted software program to pass through to a decryption unit 25. The decryption unit 25 decrypts the encrypted data file EKd(DATA) using the key Kd that is owned by the manager application program, thus restoring the original plaintext data file DATA. The contents of this decrypted data file DATA can be executed by the central processing unit (CPU) after being loaded to the memory, both of which are part of a CPU/memory unit 26 in the terminal station.

Next, a second embodiment of the present invention will be described below with reference to FIGS. 7 to 10. In the second embodiment, each software program recorded in a CD-ROM has a software identifier DID uniquely assigned thereto, and its corresponding data file Data is stored as an encrypted data file EKa(Data). This encrypted data file EKa(Data) has been created with a master medium conversion key Ka generated from the software identifier DID and a master key KM, which is managed at a software license center. The software license center is in charge of licensing of the right to copy their commercial software products. Regarding the target storage media, the user's MO disc has a serial number serving as a storage medium identifier Mid.

Figure 7:
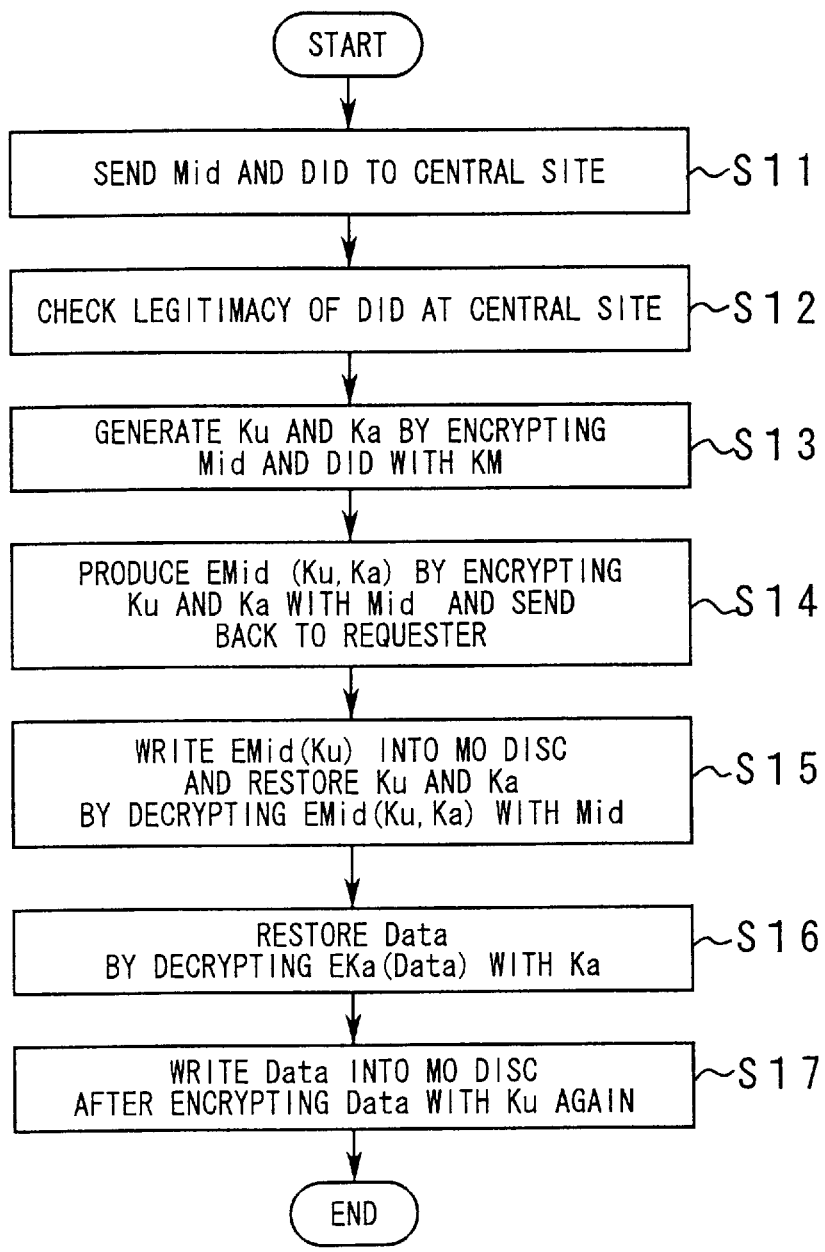
FIG. 7 is a flowchart showing a software duplication process executed by a software copying system in a second embodiment of the present invention.

FIG. 7 is a flowchart showing a software duplication process performed under the above assumption by the software copying system of the second embodiment.

To obtain a copy of a software program distributed in a CD-ROM, it is necessary to go through the following seven steps:

[S11] The storage medium identifier Mid recorded in the target MO disc and the software identifier DID of the subject software program in the CD-ROM are sent from the end user's site to the software license center, which controls the license to copy the software products.

[S12] At the software license center, it is tested whether the software identifier DID is registered therein or not.

[S13] The storage medium identifier Mid and software identifier DID are encrypted with the master key RH managed in the software license center, thus generating a storage medium conversion key Ku and master medium conversion key Ka, respectively.

[S14] A ciphertext EMid(Ku,Ka) is generated by encrypting those storage medium and master medium conversion keys Ku and Ka using the storage medium identifier Mid. The ciphertext EMid(Ku,Ka) is sent to the end user's site as a response message to the request.

[S15] The end user's site obtains the storage medium conversion key Ku and master medium conversion key Ka by decrypting the received ciphertext EZd(Ku,Ka) with the storage medium identifier Mid, while storing a ciphertext EMid(Ku), i.e., MO disc-related part of the ciphertext EMid(Ku,Ka), without attempting decryption.

[S16] With the master medium conversion key Ka obtained in step S15, the encrypted data file EKa(Data) in the CD-ROM which corresponds to the software identifier DID is decrypted to restore the original plaintext data file Data.

[Sl7] The plaintext data file Data is encrypted again with the storage medium conversion key Ku obtained in step S15, and the encrypted data file is stored into the MO disc, thus finalizing the software duplication process.

The above-described software duplication procedure will be discussed in more detail below. In the second embodiment of the present invention, the procedure starts at the end user's site with sending a request to the software license center, which part of the procedure consists of only two things as follows. One is to read out the storage medium identifier Mid of the target MO disc and the software identifier DID of the subject software stored in the CD-ROM, and the other is to send these identifiers Mid and DID to the software license center. The following description skips those two steps and will begin with the steps executed by the software license center which has received the above request from the end user's site.

Figure 8:
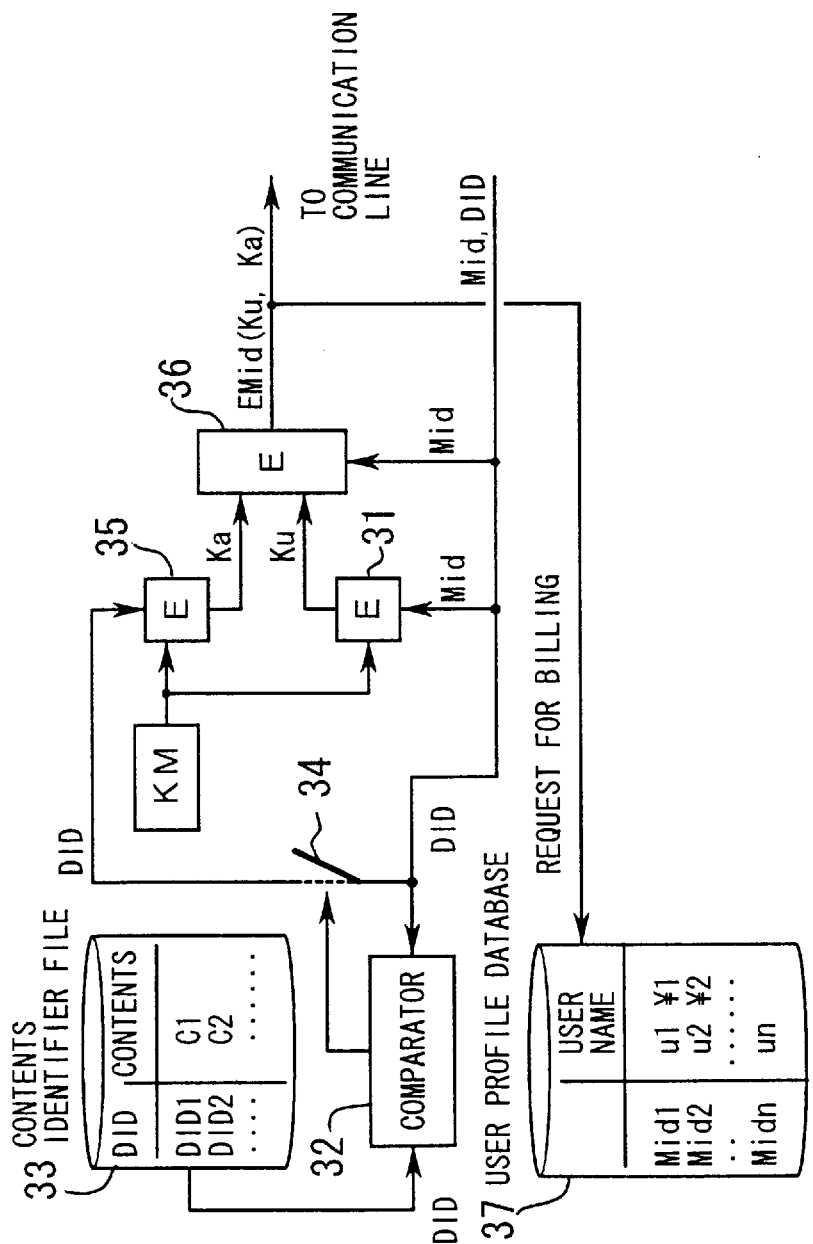
FIG. 8 is a diagram showing a procedure at the central site.

FIG. 8 explains the procedure executed at the software license center. Upon receipt of the two identifiers, Mid and DID, from the end user's site through a communications line, the software license center forwards the storage medium identifier Mid to an encryption unit 31 having the master key AM under the control of the center, as well as supplying the software identifier DID to a comparator 32. The encryption unit 31 encrypts the storage medium identifier Mid using the master key KM to produce a storage medium conversion key Ku. The comparator 32, on the other hand, searches a contents identifier file 33, comparing each entry with the received software identifier DID to verify its validity. If the received software identifier DID coincides with the one registered in the contents identifier file 33, the comparator 32 closes a switch 34, thus allowing the software identifier DID to enter to an encryption unit 35 having the master key KM. The encryption unit 35 encrypts the software identifier DID with the master key AM to create a master medium conversion key Ka. The storage medium conversion key Ku produced by the encryption unit 31 and the master medium conversion key Ka produced by the encryption unit 35 are then entered to an encryption unit 36 for further encryption using the storage medium identifier Mid. A ciphertext EMid(Ku,Ka) produced by the encryption unit 36 is transferred to the requesting end user through the communications line. Upon completion of the above processing steps, a request for billing is issued to the user profile database 37 and the cost is charged to the requesting end user.

Figure 9:
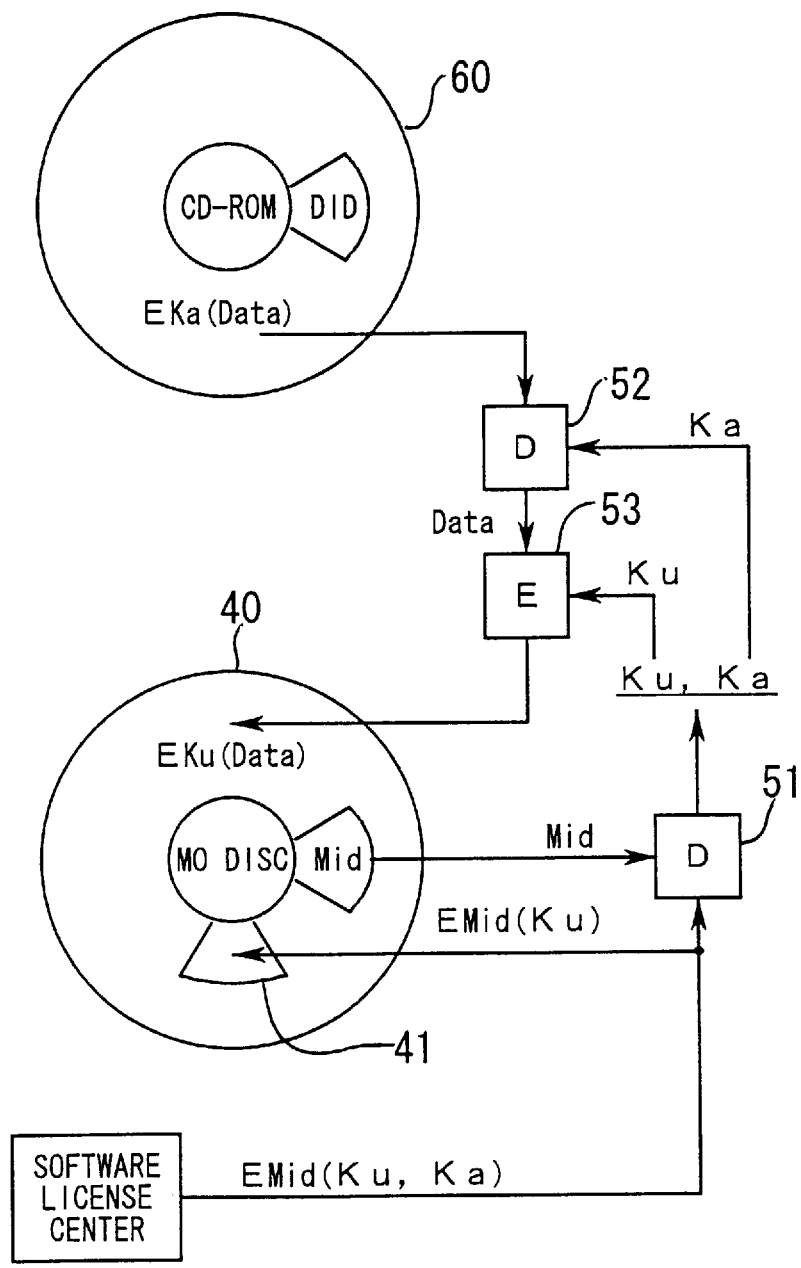
FIG. 9 is a diagram showing a procedure at the end user's site.

FIG. 9 explains the procedure at the end user's site after the above-described process is finished at the software license center. The ciphertext MEd(Ku,Ka) received from the software license center is applied to a decryption unit 51, while a ciphertext EMid(Ku) as part of the received ciphertext EMid(Ku,Ka) is written into a predetermined region 41 in the target MO disc 40. The decryption unit 51 decrypts the ciphertext EMid(Ku,Ka) using the storage medium identifier Mid extracted from the MO disc 40, thus restoring the original storage medium conversion key Ku and master medium conversion key Ka. This restored master medium conversion key Ka is then entered to a decryption unit 52 as its decryption key, while the restored storage medium conversion key Ku is entered to an encryption unit 53 as its encryption key. The decryption unit 52 retrieves the encrypted data file EKa(Data) that corresponds to the software identifier DID in the CD-ROM 60 and decrypts it with the master medium conversion key Ka, thus restoring the original plaintext data file Data. This data file Data is encrypted again by the encryption unit 53 with the storage medium conversion key Ku, and the resultant ciphertext EKu(Data) is written into the target MO disc 40.

In the way described above, the ciphertext EKu(Data) is written into the MO disc 40 through the process using two conversion keys derived from a unique identifier recorded in the MO disc 40 and a master key under the control of the software license center. Next, a procedure to execute this encrypted data file EKu(Data) will be described below.

Figure 10:
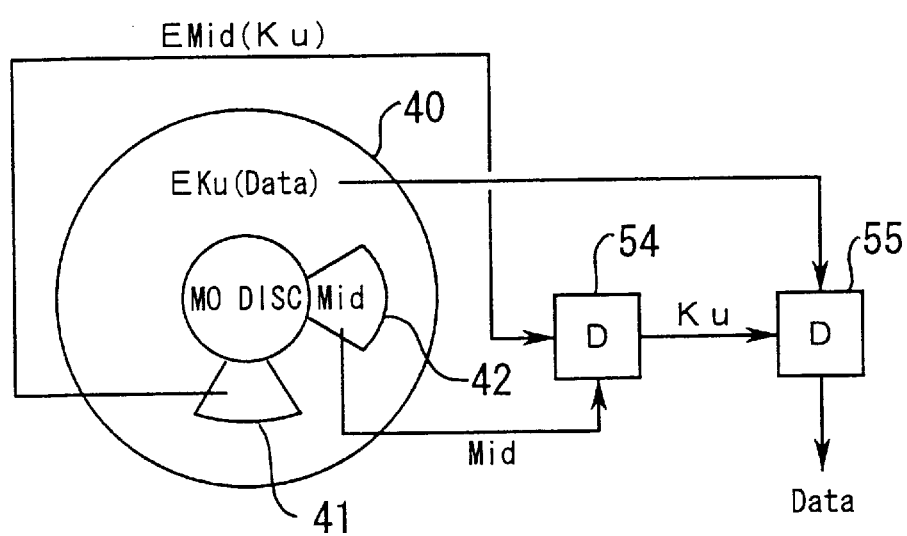
FIG. 10 is a diagram showing a procedure of executing a duplicated software program.

FIG. 10 illustrates a procedure of executing the software program that is duplicated as a data file in the MO disc 40. The ciphertext EMid(Ku) is stored in a section 41 as part of the rewritable region in the MO disc 40, while the storage medium identifier Mid is recorded in a non-rewritable region 42. The encrypted data file EKu(Data) is stored in a section in the remaining rewritable region. When the program in the encrypted data file EKu(Data) is called up for execution, the storage medium identifier Mid and ciphertext EMid(Ku) are retrieved from the MO disc 40 and entered to a decryption unit 54. Using the storage medium identifier Mid as the decryption key, the decryption unit 54 decrypts the ciphertext EMd (Ku) to restore the storage medium conversion key Ku. Another decryption unit 55 then decrypts the encrypted data file EKu (Data) retrieved from the MO disc 40, using the storage medium conversion key Ku as the decryption key. The resultant plaintext data file Data will be executed after being loaded to the main memory of a personal computer that is working as the end user's terminal station.

The above discussion will be summarized as follows. According to the present invention, the software copying system comprises signature generating means, disposed at the central site, for generating a signature from information that identifies the target storage medium and subject data stored in the master medium. The system also comprises, at the end user's site, signature writing means for writing the signature generated by the signature generating means into the target storage medium, signature generating/comparing means for comparing a signature that is locally generated at the end user's site with the signature written in the target storage medium, and data copying means for copying the subject program to the target storage medium according to the result of comparison. Therefore, the central site only has to issue a signature associated with the identifier of the target storage medium, and there is no need to manage any license-specific information in close liaison with factories of the storage medium manufacturers. This also eliminates the stock control in the manufacturers and retailers for the storage media to be used in software copying.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A software copying system for duplicating software recorded in a master storage medium to a target storage medium in a legitimate -manner achieved through communications between an end user's site that is requesting a license of copying the software and a central site that manages the license, the software copying system comprising:

contents identifier reading means for reading out a first identifier from the master storage medium, said first identifiers being uniquely assigned to the software program recorded in the master storage medium;

storage medium identifier reading means for reading out a second identifier from the target storage medium, the second identifier being uniquely assigned to the target storage medium;

signature generating means, disposed at the central site, for generating a first signature from the first identifier read out by said contents identifier reading means and the second identifier read out by said storage medium identifier reading means, the first signature serving as a certificate of a license to copy the software program;

signature writing means for writing the first signature generated by said signature generating means into the target storage medium;

signature generating/comparing means for generating a second signature, for a verification purpose, from the first identifier read out by said contents identifier reading means and the second identifier read out by said storage medium identifier reading means, and comparing the first signature stored in the target storage medium with the second signature; and data copying means for retrieving the software program out of the master storage medium and writing the software program into the target storage medium, when the first and second identifiers turned out to be identical as a result of the comparison performed by said signature generating/comparing means.

2. A software copying system according to claim 1, wherein said signature generating means comprises signature processing means for encrypting the first identifier read by said contents identifier reading means and the second identifier read by said storage medium identifier reading means using a certification key managed at the central site, to produce a certificate code that serves as the first signature, and encrypting means for encrypting the certification key using a user key registered at the central site, and sending the encrypted certification key for use in said signature generating/comparing means to generate the second signature.

3. A software copying system according to claim 2, herein said signature generating/comparing means comprises decrypting means for decrypting the encrypted certification key using the user key, which is registered at the central site, to produce a decrypted certification key, certificate code generating means for generating another certificate code for verification, which will serve as the second signature, by encrypting the first identifier read by said contents identifier reading means and the second identifier read by said storage medium identifier reading means using the decrypted certification key, and comparing means for comparing the certificate code for verification generated by said certificate code generating means with the certificate code stored as the first signature in the target storage medium.

4. A software copying method for duplicating software recorded in a master storage medium to a target storage medium in a legitimate manner achieved through communications between an end user's site that is requesting a license to copy the software and a central site that manages the license, the software copying method comprising the steps of:

sending from the end user's site to the central site a storage medium identifier that is uniquely assigned to the target storage medium and a contents identifier that is uniquely assigned to a subject data file, together with a message requesting a software license;

generating at the central site a first certificate code from the storage medium identifier and the contents identifier received from the end user site, through a signature generating process using a certification key that is managed at the central site;

generating at the central site an encrypted certification key by encrypting the certification key using a user key;

sending from the central site to the end user's site the first certificate code and the encrypted certification key;

writing at the end user's site the first certificate code and the encrypted certification key received from the central site into the target storage medium;

obtaining at the end user's site a decrypted certification key by decrypting the encrypted certification key, which is stored in the target storage medium, using the user key;

generating at the end user's site a second certification code for a verification purpose by applying a signature generating process using the decrypted certification key to the storage medium identifier and the contents identifier;

comparing the first certificate code stored in the target storage medium with the second certificate code that is generated at the end user's site; and reading out the subject data file stored in the master storage medium and writing the subject data file into the target storage medium if the first and second certificate codes coincide with each other.

5. A software copying system for duplicating software recorded in a master storage medium to a target storage medium in a legitimate manner achieved through communications between an end user's site that is requesting a license to copy the software and a central site that manages the license, the software copying system comprising:

contents identifier reading means for reading a first identifier uniquely assigned to a software product, which are both recorded in the master storage medium;

storage medium identifier reading means for reading a second identifier uniquely assigned to the target storage medium and recorded therein;

conversion key generating means, disposed at the central site, for generating a storage medium conversion key from the first identifier read by said contents identifier reading means, generating a master medium conversion key from the second identifier read by said storage medium identifier reading means, and generating an encrypted storage medium conversion key and an encrypted master medium conversion key by respectively encrypting the storage medium conversion key and the master medium conversion key using the second identifier;

conversion key writing means for writing the encrypted storage medium conversion key generated by said conversion key generating means into the target storage medium;

conversion key decrypting means for generating a decrypted storage medium conversion key and a decrypted master medium conversion key by respectively decrypting, using the second identifier read by said storage medium identifier reading means, the encrypted storage medium conversion key and the encrypted master medium conversion key generated by said conversion key generating means;

data decrypting means for reading out the target data file recorded in the master storage medium and producing a plaintext data file by decrypting the target data file using the decrypted master medium conversion key generated by said conversion key decrypting means; and data writing means for producing an encrypted data file by encrypting the plaintext data file using the decrypted storage medium conversion key generated by said conversion key decrypting means and writing the encrypted data file into the target storage medium.

6. A software copying system according to claim 5, wherein said conversion key generating means comprises first encrypting means for generating the storage medium conversion key by encrypting the first identifier read out by said contents identifier reading means, using a master key that is managed at the central site;

second encrypting means for producing the master medium conversion key by encrypting the second identifier read out by said storage medium identifier reading means, using the master key; and third encrypting means for producing the encrypted storage medium conversion key and the encrypted master medium conversion key by encrypting the storage medium conversion key and the master medium conversion key using the second identifier read out by said storage medium identifier reading means.

7. A software copying system for duplicating a subject data file recorded in a master storage medium to a target storage medium, the subject data file being encrypted with a master medium conversion key produced from a contents identifier to identify software products and a master key managed at a central site which deals licenses to copy software products, the software copying system comprising the steps of:

sending from the end user's site to the central site a contents identifier that is uniquely assigned to the subject data file and a storage medium identifier that is uniquely assigned to the target storage medium;

producing at the central site a master medium conversion key and a storage medium conversion key by respectively encrypting the contents identifier and the storage medium identifier using a master key managed at the central site;

generating an encrypted storage medium conversion key and an encrypted master medium conversion key by respectively encrypting the storage medium conversion key and the master medium conversion key using the storage medium identifier;

sending from the central site to the end user's site the encrypted master medium conversion key and the encrypted storage medium conversion key writing the encrypted storage medium conversion key into the target storage medium;

generating a decrypted storage medium conversion key and a decrypted master medium conversion key by respectively decrypting the encrypted storage medium conversion key and the encrypted master medium conversion key using the storage medium identifier;

decrypting the subject data file recorded in the master storage medium to produce a plaintext data file by decrypting the target data file using the decrypted master medium conversion key;

producing an encrypted data file by encrypting the plaintext data file using the decrypted storage medium conversion key; and writing the encrypted data file into the target storage medium.

* * * * *